United States Patent
Richard

(10) Patent No.: US 7,099,797 B1
(45) Date of Patent: Aug. 29, 2006

(54) SYSTEM AND METHOD OF TESTING SOFTWARE AND HARDWARE IN A RECONFIGURABLE INSTRUMENTED NETWORK

(75) Inventor: Philippe Richard, Corrales, NM (US)

(73) Assignee: Avanza Technologies, Inc., Whittier, CA (US)

( * ) Notice: Subject to any disclaimer, the term of this patent is extended or adjusted under 35 U.S.C. 154(b) by 16 days.

(21) Appl. No.: 10/888,791

(22) Filed: Jul. 8, 2004

Related U.S. Application Data

(60) Provisional application No. 60/485,827, filed on Jul. 8, 2003.

(51) Int. Cl.
*G06F 11/30* (2006.01)
*G06F 13/12* (2006.01)

(52) U.S. Cl. .............. 702/182; 702/183; 702/185; 702/186; 703/21; 709/224; 714/47

(58) Field of Classification Search ........ 702/182, 702/183, 185, 186; 703/21; 709/224; 714/47
See application file for complete search history.

(56) References Cited

U.S. PATENT DOCUMENTS

| | | |
|---|---|---|
| 6,295,557 B1 | 9/2001 | Foss et al. |
| 6,324,492 B1 | 11/2001 | Rowe |
| 6,324,656 B1 | 11/2001 | Gleichauf et al. |
| 6,408,335 B1 | 6/2002 | Schwaller et al. |
| 6,418,544 B1 | 7/2002 | Nesbitt et al. |
| 6,477,483 B1 | 11/2002 | Scarlatt et al. |
| 6,535,227 B1 | 3/2003 | Fox et al. |
| 6,557,120 B1 | 4/2003 | Nicholson et al. |
| 6,560,564 B1 | 5/2003 | Scarlatt et al. |
| 6,694,288 B1 * | 2/2004 | Smocha et al. ............ 702/186 |

(Continued)

OTHER PUBLICATIONS

Roger S. Pressman, Ph.D., Software Engineering, 1997, 785, 798, 799, and 800, McGraw-Hill Companies, Inc.

*Primary Examiner*—Marc S. Hoff
*Assistant Examiner*—Janet L Suglo
(74) *Attorney, Agent, or Firm*—Roberts Mardula & Wertheim, LLC

(57) ABSTRACT

A method of testing a computer system in a testing environment formed of a network of routers, servers, and firewalls. Performance of the computer system is monitored. A log is made of the monitored performance of the computer system. The computer system is subjected to hostile conditions until it no longer functions. The state of the computer system at failure point is recorded. The performance monitoring is done with substantially no interference with the testing environment. The performance monitoring includes monitoring, over a sampling period, of packet flow, hardware resource utilization, memory utilization, data access time, or thread count. A business method entails providing a testing environment formed of a network of network devices including routers, servers, and firewalls, while selling test time to a customer on one or more of the network devices during purchased tests that test the security of the customer's computer system. The purchased tests are conducted simultaneously with other tests for other customers within the testing environment. Customer security performance data based on the purchased tests is provided without loss of privacy by taking security measures to ensure that none of the other customers can access the security performance data. The tests may also be directed to scalability or reliability of the customer's computer system. Data about a device under test is gathered using a managed information kernel that is loaded into the devices operating memory before its operating system. The gathered data is prepared as managed information items.

18 Claims, 2 Drawing Sheets

U.S. PATENT DOCUMENTS

2003/0012141 A1    1/2003  Garrevink
2003/0065986 A1*   4/2003  Fraenkel et al. .............. 714/47
2003/0088664 A1    5/2003  Hannel et al.
2003/0212908 A1*   11/2003 Piesco ........................ 713/201

* cited by examiner

SYSTEM AND METHOD OF TESTING SOFTWARE AND HARDWARE IN A RECONFIGURABLE INSTRUMENTED NETWORK

CROSS REFERENCE TO RELATED APPLICATION

This application claims priority benefit under 35 U.S.C. § 119(e) of provisional application No. 60/485,827, filed Jul. 8, 2003. The Ser. No. 60/485,827 application is incorporated by reference herein, in its entirety, for all purposes.

FIELD OF INVENTION

The present invention relates generally to the field of testing hardware and software. More particularly, the present invention is a system and method for testing hardware and software in a configurable, instrumented network.

BACKGROUND OF THE INVENTION

Testing of software and hardware is a daunting undertaking. A simple program to add only two integer inputs of 32-bits (yielding $2^{64}$ distinct test cases) would take hundreds of years, even if tests were performed at a rate of thousands per second. Given the complexity of modern software, testing every permutation of all of the inputs and all of the functions of a software program is not possible. However, not testing software and hardware, particularly when our lives, finances and security depend on the proper operation of this technology, is unthinkable (or should be).

The challenge of testing software is made even more complex in today's vastly distributed networks like the Internet. Identifying and remedying problems that arise through unexpected interactions with third party software and hardware is extremely difficult.

The challenge is to find a means to exercise software and hardware systems (collectively, sometimes referred to as a "system") to minimize the risk that the system will break down, produce erroneous data, or permit unauthorized access to data when operating in a real-world environment, or that the system cannot be expanded to handle increasing traffic.

Performance, capacity, and stress testing are all closely related, and load tests can be used to perform all three. The difference is in which test metrics are being evaluated. Performance testing determines the response times a user can expect from a system as the system is subjected to increasing load. Capacity testing determines how many concurrent and total users a system can handle with a predetermined acceptable level of performance. Capacity planning determines how many concurrent and total users a system needs to be able to support to meet the business objectives of system operator. For example, the business objective might be, "The server needs to be able to support 400 concurrent users with response times under five seconds, and the database needs to support one million total users." Capacity planning also involves determining what hardware and software is required to meet those business objectives.

Scalability is an important consideration in capacity planning because business objectives may change, requiring that the system handle more traffic. Naturally, an operator will want to add increased capacity to its site at the lowest cost possible.

Capacity testing is used to validate that a solution meets the business objectives determined during capacity planning. Stress testing is designed to determine the maximum load a system can sustain while generating fewer errors (e.g., timeouts) than a predetermined acceptable rate. Stress and stability testing also examines and tries to determine the maximum load a Web site can sustain without crashing.

Since the events of Sep. 11, 2001, additional test protocols have been developed to evaluate systems with respect to information assurance, authentication and controlled access. Addressing these security concerns may impact the performance of a system.

System testing today comes in several forms. Hardware manufacturers provide test beds to test software on branded servers, but the test bed does not facilitate scalability or other capacity testing. Third party testing tools allow system developers to perform testing in a "micro-environment" but do not provide means to test in a real-world environment.

A load testing system has been described as having multiple load testing servers that are configured to apply a load to a target web site, or other target server system, remotely over the Internet. The described system provides no ability for instrumentation in a closed area and no ability to bring testing to break point. For additional details, refer to U.S. Pat. No. 6,477,483 and U.S. Pat. No. 6,560,564 to Scarlatt et al.

A system has been described that uses an altered form of client cache which purports to enable more realistic and representative client requests to be issued during the testing process. The described system does not teach an infrastructure with full instrumentation that can be tested to failure, nor does it teach a method for replicating the complexity of large-scale server deployment of applications on multiple servers in large distributed environments like Internet or LAN. For additional details, refer to U.S. Pat. No. 6,418,544 to Nesbitt et al.

A structure has been described for generating packet streams that are configurable to simulate non-consecutive network traffic (e.g., Internet traffic). For additional details, refer to published patent application US 2003-0012141 by Gerrevink.

A method and system has been described for simulating multiple concurrent clients on a network server to stress test the server. For additional details, refer to U.S. Pat. No. 6,324,492 to Rowe.

A system has been described for test communications network performance utilizing a test scenario simulating actual communications traffic on the network to be tested. Performance data may be monitored at one of the endpoint nodes of each endpoint node pair and reported to the console node either as it is generated or after completion of the test. For additional details, refer to U.S. Pat. No. 6,408,335 to Schwaller et al.

Methods and systems have been described for testing stateful network communications devices are disclosed. According to one test method, stateful and simulated stateless sessions are established with a device under test. Packets are sent to the device under test over the stateful and stateless connections. Information received on the stateful connections is used to alter test conditions on the stateless connections. As a result, a realistic mix of network traffic can be achieved with a reduced amount of hardware. For additional details, refer to published patent application US 2003-0088664 by Hannel et al.

A system and method have been described for simulating a plurality of TCP connections directed toward an Internet site under test. The method includes retrieving information from the TCP connection and recording statistics related to the information. For additional details, refer to U.S. Pat. No. 6,295,557 to Foss et al.

A system and method have been described for accelerated reliability testing of computer system software components over prolonged periods of time. The system and method provide for tracking the reliability of system components and logs failures of varying severity that may be expected to occur over time. This data is useful, among other things, for estimating mean time between failures for software being tested and expected support costs. This information is particularly useful in providing a reliability measure where multiple independently developed software modules are expected to function together. The testing includes random scheduling of tasks and sleep intervals reflecting expected usage patterns, but at a faster pace to efficiently sample the state space to detect sequence of operations that are likely to result in failures in actual use. For additional details, refer to U.S. Pat. No. 6,557,120 to Nicholson et al.

A graphical user interface has been described as contained on a computer screen and used for determining the vulnerability posture of a network. A system design window displays network items of a network map that are representative of different network elements contained within the network. The respective network icons are linked together in an arrangement corresponding to how network elements are interconnected within the network. Selected portions of the network map turn a different color indicative of a vulnerability that has been established for that portion of the network after a vulnerability posture of the network has been established. For additional details, refer to U.S. Pat. No. 6,535,227 to Fox et al.

A computer-implemented method has been described for rules-driven multi-phase network vulnerability assessment. The method comprises pinging devices on a network to discover devices with a connection to the network. Port scans are performed on the discovered devices and banners are collected. Information from the collected banners is stored as entries in a first database. Analysis is performed on the entries by comparing the entries with a rule set to determine potential vulnerabilities. The results of the analysis are stored in a second database. For additional details, refer to U.S. Pat. No. 6,324,656 to Gleichauf et al.

These described concepts are directed to a variety of problems associated with testing hardware and software systems. However, collectively they do not teach operating a closed testing environment that can faithfully duplicate (as opposed to emulate) the operating environment of the system under test (SUT). While certain data may be logged (errors, response times, etc), the testing environment is not instrumented to permit a fully diagnostic view of the response of the SUT to simulated input. Further, the SUT is not tested to failure in conjunction with the instrumented environment to determine failure modes, recovery modes, and failure avoidance.

What is needed is a system and method for testing hardware and software systems in a fully instrumented environment that accurately duplicates the operating environment of the SUT and that can test the SUT to failure.

BRIEF SUMMARY OF THE INVENTION

One aspect of the present invention concerns a method of testing a computer system in a testing environment formed of a network of routers, servers, and firewalls. The method includes monitoring performance of the computer system, making a log of the monitored performance of the computer system, subjecting the computer system to hostile conditions until it no longer functions; and then recording the state of the computer system at failure point. The testing environment is configurable to simulate an environment the computer system is to be used in. The performance monitoring is done with substantially no interference with the testing environment. The performance monitoring includes monitoring, over a sampling period, of packet flow, hardware resource utilization, memory utilization, data access time, or thread count.

Another aspect of the present invention is conduct of a testing business. The business method entails providing a testing environment formed of a network of network devices including routers, servers, and firewalls, while selling test time to a customer on one or more of the network devices during purchased tests that test the security of the customer's computer system. The purchased tests are conducted simultaneously with other tests for other customers within the testing environment. Customer security performance data based on the purchased tests is provided without loss of privacy by taking security measures to ensure that none of the other customers can access the security performance data. The tests may also be directed to scalability or reliability of the customer's computer system.

Another aspect of the present invention is the gathering of data about a device under test using a managed information kernel that is loaded into the devices operating memory before its operating system. The gathered data is prepared as managed information items.

DETAILED DESCRIPTION

An embodiment of the present invention is a closed testing environment (system of servers creating a realistic replica of a large, complex network such as an intranet, the Internet, or any wide area network) whereby users can load and test software and hardware systems for performance, capacity, stress, vulnerability, scalability, and stability. In this embodiment, the closed testing environment comprises a network of routers, servers, and firewalls, all of which are configurable to represent the system developer's or system user's own environment. A system under test is tested until it no longer functions. The system performance is monitored and the results logged so that the state of the system at the failure point is recorded and reported to the system developer. Additionally, the system may be tested under a variety of scenarios such as increased loads, failure of selected components of the system, temporal changes and the like. In short, a developer or system operator can establish a variety of conditions under which the system might operate to evaluate system performance under such conditions. Further, the testing environment of the present invention supports the ability for multiple tests from multiple customers to be performed simultaneously, thus introducing a much more realistic level of complexity while retaining full instrumentation.

The present invention and associated instrumentation has it's the ability to monitor most, if not all variables of interest to a user and system administrator with little or no interference with the environment being tested. The instrumentation is non-intrusive to the system being run and thus has virtually no impact in the network being tested. Also, the instrumentation data can be provided reliably to each customer participating in the test without any loss of privacy regarding results since security measures are taken to ensure that no one or entity can obtain the data that has not been authorized to do so.

Figure 1:
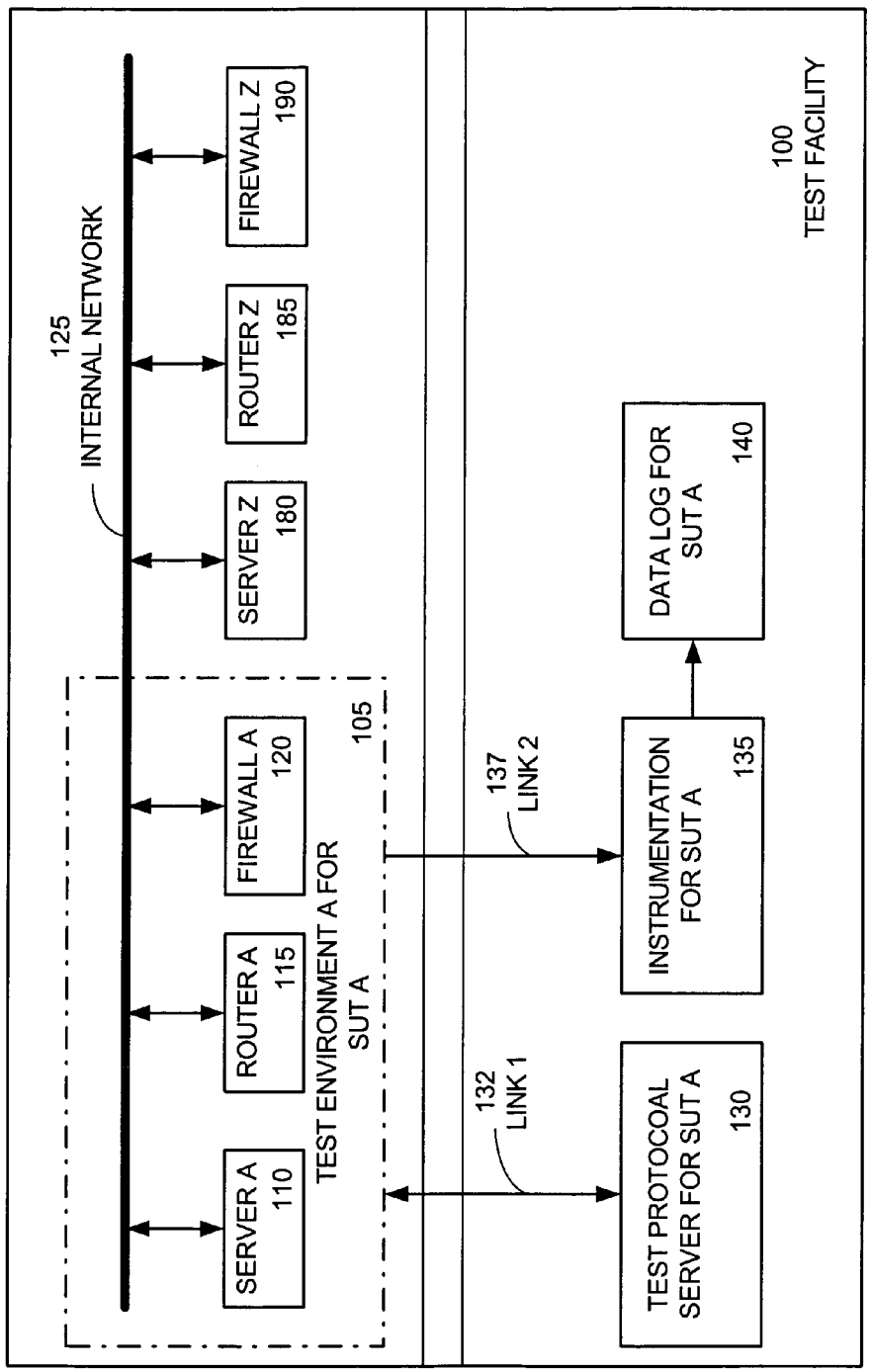
FIG. 1 illustrates a block diagram of the testing environment according to an embodiment of the present invention.
Figure 2:
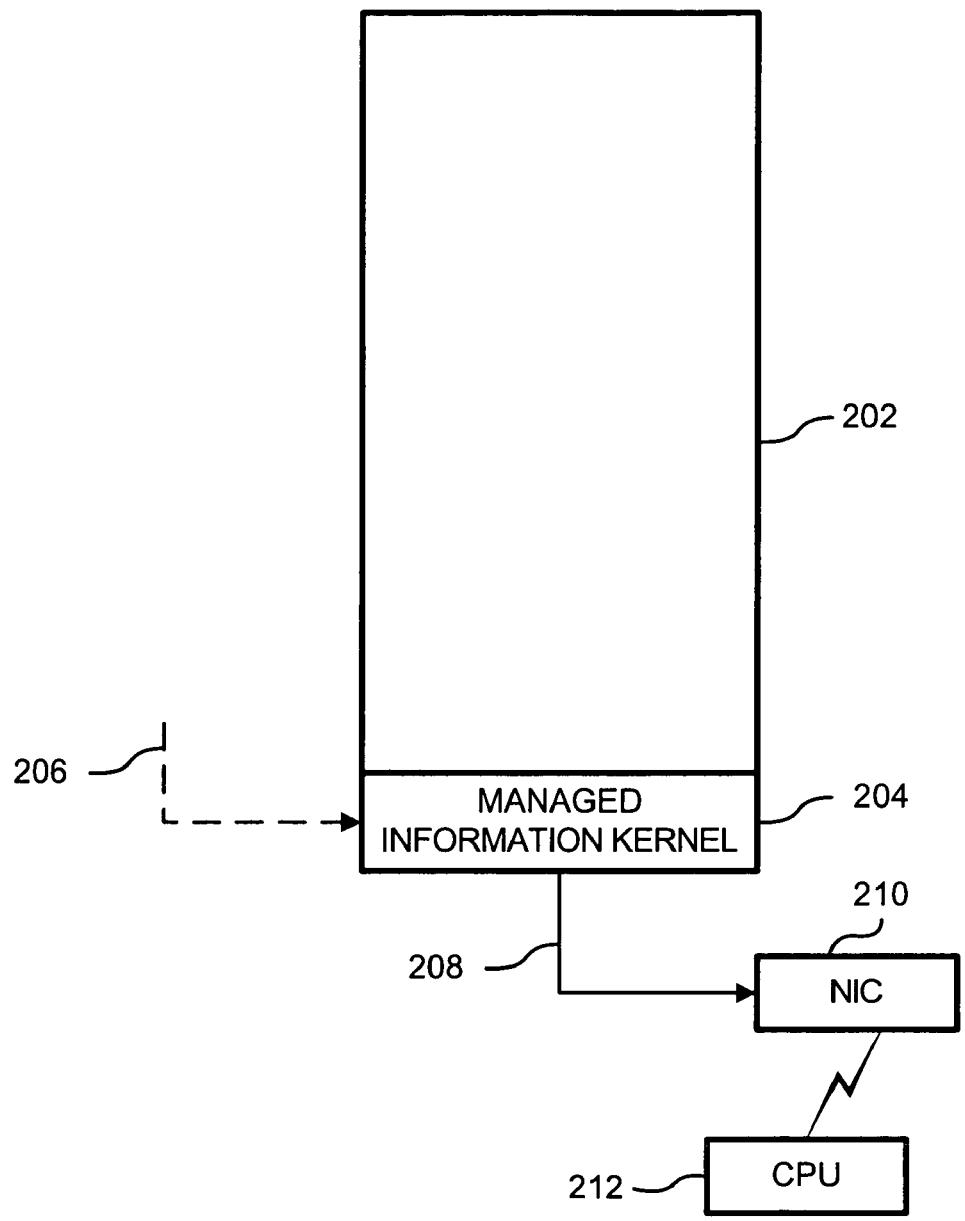
FIG. 2 illustrates a hidden kernel that is loaded into the operating memory of each device under test at boot up according to one embodiment of the present invention.

FIG. 1 illustrates a block diagram of the testing environment according to an embodiment of the present invention. A test facility 100 comprises a plurality of network devices. A server 110, a router 115, firewall 120, a server 180, a router 185, and a firewall 190 are connected to an internal network 125. While three classes of network devices have been illustrated, the present invention is not so limited. As will be appreciated by those skilled in the art, the class and number of network devices connected to the internal network 125 is limited only by cost, space, and network capacity factors and other network devices performing a wide variety of tasks may be incorporated into the test facility 100 without departing from the scope of the present invention. Further, an exemplary embodiment may have a large number of servers and routers as defined by the user that desires a test of the user's system.

A test environment for a system under test is also illustrated. Test environment A for SUT A 105 comprises server 110, a router 115, firewall 120. In this embodiment of the present invention, these network devices have been assigned to replicate the operating environment of SUT A. As will be appreciated by those skilled in the art, other network devices may also be allocated to test environment A 105 without departing from the scope of the present invention. Again, an exemplary embodiment for the system under test may have a large number of servers and routers as defined by the user that desires a test of the user's system. Although not illustrated, test facility 100 may be adapted to handle multiple test environments simultaneously depending on the needs of multiple customers and the availability of servers and related equipment. For example, server 180 and firewall 190 may be assigned to replicate a test environment for a different system under test.

A test protocol server for SUT A 130 is connected via LINK 1 132 to the test environment for SUT A 105. Test protocol server 130 is adapted to simulate loading of from tens to hundreds of thousands of users with network topologies that reproduce the level of complexity of the user interface to the SUT. Instrumentation for SUT A 135 receives performance metrics for SUT A via LINK 2 137 and reports these measured values to data log for SUT A 140. These protocols are also referred to as "scenarios."

In another embodiment of the present invention, the test protocol server 130 is adapted to exercise test environment A 105 until SUT A fails (sometimes referred to as the "breaking point" of the SUT). The results of the breaking point are gathered by instrumentation A 135 via LINK 2 137 and stored in data log 140. The test protocol server 130 and the instrumentation A 135 are further adapted to test the scalability, security, and load conditions of SUT A in near real time.

By way of illustration, instrumentation A 135 monitors metrics including packet flow, hardware resource utilization, memory utilization, data access time, thread count, and similar metrics over a sampling period. The data is extracted and correlated to the exercise conditions faced by the test environment A 105 as produced by test protocol server 130. This data is captured continuously until SUT A fails.

As previously noted, the test environment A 105 is configurable to replicate the actual environment in which SUT A is to be operated and the actual configuration of servers, routers, printers and other equipment proposed by a user. By way of example and not as a limitation, test environment A 105 may replicate a command and control environment of the military, a financial markets such as the Chicago Board of Trade, and a health industry scenarios under HIPAA (Health Insurance Portability and Accountability Act) guidelines. Test facility 100 may be adapted to replicate all of these environments simultaneously.

In another embodiment of the present invention, the resources and capabilities of test facility 100 are offered to the public based on selling test time on one or more network devices during a rotating series of tests designed to test the security, scalability, and reliability of the customer's SUT. This business model provides customers with test consolidation, staging, execution, and data acquisition services. Deliverables comprise instrumentation data, vulnerability remediation, code redesign or a combination thereof.

According to one embodiment of the present invention, gathering of data for the instrumentation needs of the system is provided by way of a hidden kernel that is loaded into the operating memory of each device under test at boot up. Before the main operating system for the device under test is loaded into memory 202, a managed information kernel 204 is loaded, which operates independently of the main operating system. The managed information kernel reads 206 operational information directly from the main CPU (not shown) of the device and prepares managed information items that are sent 208 to the kernel's own CPU 212 via its own dedicated network interface card (NIC) 210.

The managed information items are each a binary container that contains a payload of operational information from within the device under test, as well as an intelligent header that encrypts the payload based on context. The context is a combination of user identity and time/place restrictions. Each of the managed information items may be read only under the appropriate context conditions. This is helpful in keeping track of, and maintaining confidentiality of, test information in a system that is performing tests for multiple customers simultaneously. The secure nature of managed items is disclosed in detail in U.S. application Ser. No. 10/699,632, filed Nov. 1, 2003, which is incorporated by reference herein.

By testing proposed system configurations, the present invention can create a record of what situation caused failure in the system under test. In this way, not only can system configurations be evaluated and recommendations made for improvements in configuration, but application software can be evaluated, such as security and cryptographic systems, to see if ways can be found to "crack" or hack into the systems. In that way similar attacks can be thwarted by taking proactive measures to counter any threat discovered.

A system and method of testing a system in a replicated instrumented environment has now been described. It will be understood by those skilled in the art of the present invention that it may be embodied in other specific forms without departing from the scope of the invention disclosed and that the examples and embodiments described herein are in all respects illustrative and not restrictive. Those skilled in the art of the present invention will recognize that other embodiments using the concepts described herein are also possible.

What is claimed is:

1. A system for testing a network architecture comprising:
a test network;
an inventory of network devices connected to the test network;
a closed test environment comprising selected network devices selected from the inventory of network devices, wherein the selected network devices are adapted for duplicating a configuration of the network architecture and wherein a selected network device comprises a resident operating system, a resident processor, and a resident memory;
a test protocol server connected to the test network and adapted for operating a test protocol to simulate a loading of the closed test environment, wherein the loading of the closed test environment comprises increasing a number of simulated users over time;
a managed information kernel adapted for:
loading into the resident operating memory of the selected network device,
wherein the managed information kernel operates independently of the resident
operating system and resident processor;
acquiring performance metrics from the resident processor indicative of the performance of the selected network device; and
transmitting the performance metrics of the selected network device to a managed information processor associated with the selected network device, wherein the managed information processor is independent of the resident processor.

2. The system of claim 1, wherein the selected network device is selected from the group consisting of a server, a router, a hub, a printer, a firewall, a wireless access point, and a storage device.

3. The system of claim 1, wherein the performance metrics are selected from the group consisting of packet flow, hardware resource utilization, memory utilization, data access time, and thread count.

4. The system of claim 1 further comprising a data store, and wherein the data store is adapted for:
receiving and storing the performance metrics from the managed information processor associated with the selected network device; and
receiving and storing other performance metrics from other managed information processors associated with other selected network devices of the closed test environment.

5. The system of claim 4, wherein the test protocol server is further adapted to:
retrieving the performance metrics and the other performance metrics from the data store; and
analyzing the performance metrics and the other performance metrics to determine a measure of performance of the network architecture.

6. The system of claim 5, wherein the measure of performance of the network architecture is selected from the group consisting of network response time, network capacity, network stress, network vulnerability, network scalability, and network stability.

7. The system of claim 1, wherein the test protocol server is further adapted for ceasing operation of the test protocol when a test objective is achieved.

8. The system of claim 7, wherein the test objective is selected from the group consisting of a predetermined unacceptable level of performance, a predetermined capacity minimum, a predetermined maximum response time, a predetermined error rate, and a failure of the test environment to function.

9. The system of claim 1, wherein the network architecture comprises software components and hardware components.

10. A method of testing a network architecture comprising:
defining a configuration of the network architecture;
creating a closed test environment from network devices selected from an inventory of network devices, wherein a selected network device comprises a resident operating system, a resident processor, and resident memory and wherein the selected network devices are selected to duplicate the configuration of the network architecture;
loading a managed information kernel into the resident memory of the selected network device, wherein the managed information kernel operates independently of the resident operating system and the resident processor;
operating a test protocol adapted for simulating loading of the closed test environment, wherein the loading of the closed test environment comprises increasing a number of simulated users over time;
acquiring performance metrics from the resident processor indicative of the performance of the selected network device during the operation of the test protocol; and
transmitting the performance metrics to a managed information processor associated with the selected network device independent of the resident processor.

11. The method of testing a network architecture of claim 10, wherein the selected network device is selected from the group consisting of a server, a router, a hub, a printer, a firewall, a wireless access point, and a storage device.

12. The method of testing a network architecture of claim 10, wherein the performance metrics are selected from the group consisting of packet flow, hardware resource utilization, memory utilization, data access time, and thread count.

13. The method of testing a network architecture of claim 10 further comprising:
storing the performance metrics from the managed information processor associated with the selected network device in a data store; and
storing other performance metrics from other managed information processors associated with other selected network devices of the closed test environment in the data store.

14. The method of testing a network architecture of claim 13 further comprising:
retrieving the performance metrics and the other performance metrics from the data store; and
analyzing the performance metrics and the other performance metrics to determine a measure of performance of the network architecture.

15. The method of testing a network architecture of claim 14, wherein the measure of performance of the network architecture is selected from the group consisting of network response time, network capacity, network stress, network vulnerability, network scalability, and network stability.

16. The method of testing a network architecture of claim 1 further comprising ceasing operation of the test protocol when a test objective is achieved.

17. The method of testing a network architecture of claim 16, wherein the test objective is selected from the group consisting of a predetermined unacceptable level of performance, a predetermined capacity minimum, a predetermined maximum response time, a predetermined error rate, and a failure of the test environment to function.

18. The method of testing a network architecture of claim 11, wherein the network architecture comprises software and hardware components.

* * * * *